May 19, 1925.
H. B. HAMILTON
LAWN ROLLER
Filed Dec. 17, 1924
1,538,550
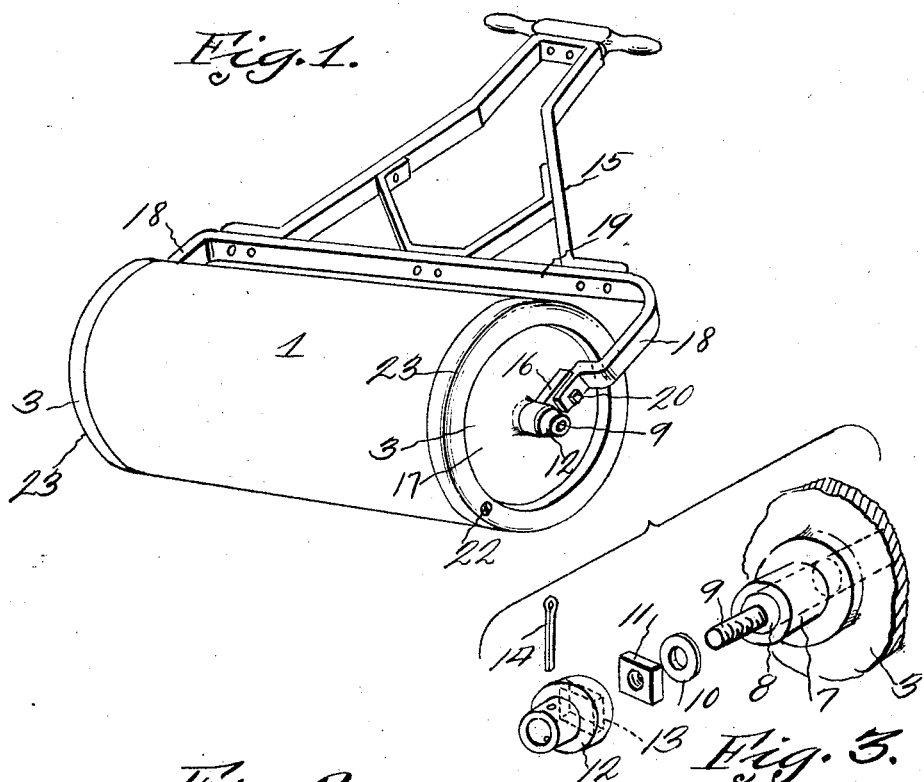
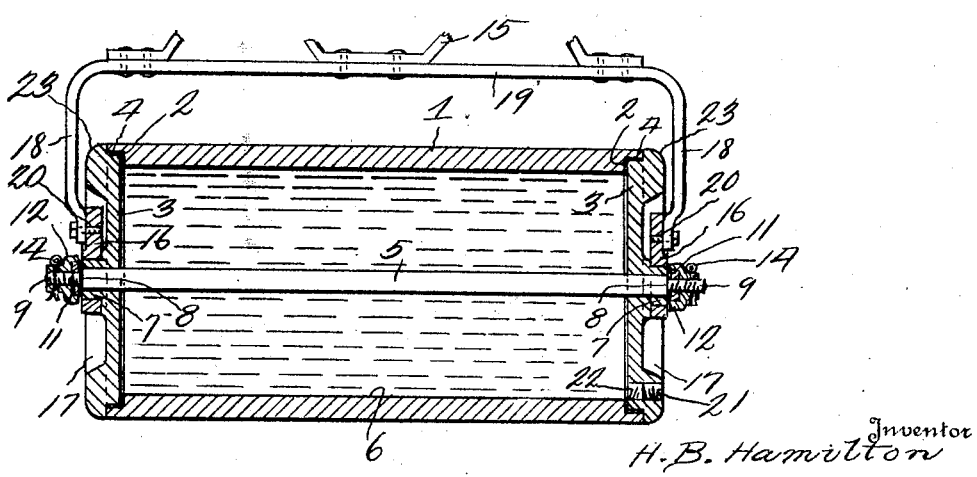

Patented May 19, 1925.

1,538,550

UNITED STATES PATENT OFFICE.

HARRY B. HAMILTON, OF ELIZABETHTOWN, PENNSYLVANIA, ASSIGNOR TO BUCH MANUFACTURING CO., OF ELIZABETHTOWN, PENNSYLVANIA.

LAWN ROLLER.

Application filed December 17, 1924. Serial No. 756,538.

*To all whom it may concern:*

Be it known that I, HARRY B. HAMILTON, a citizen of the United States, residing at Elizabethtown, in the county of Lancaster, State of Pennsylvania, have invented a new and useful Lawn Roller; and I do hereby declare the following to be a full, clear, and exact description of the invention, such as will enable others skilled in the art to which it appertains to make and use the same.

The invention relates to lawn rollers, and has for its object to provide a device of this character of the water ballast type, and means whereby water will be positively prevented from leaking therefrom or reaching the bearings of the handle member carried by the roller, thereby preventing corrosion and sticking of the bearings.

A further object is to provide a lawn roller comprising a cylindrical body member having a chamber extending therethrough and end plates carried by the body member for closing the ends of the chamber, said end plates being adhesively joined to the ends of the body member, preferably in channels by means of white or red lead, and a shaft extending axially through the cylindrical body member and the end plates and outwardly extending bosses carried by the end plates, and on the ends of which shaft, locked nuts are threaded and cooperating with washers engaging shoulders of the shaft, and the outer ends of the bosses, thereby forming a water tight joint and positively holding the end plates in position. The outer peripheries of the bosses form bearing members for the arms of the handle member.

A further object is to provide bearing brackets in which the bosses of the end plates are rotatably mounted, said bearing brackets being secured to arms of the handle member overlying the ends of the roller detachably, thereby allowing handle to be easily and quickly attached to the bearing brackets which are disposed within chambers in the outer faces of the end plates.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a perspective view of the lawn roller.

Figure 2 is a horizontal sectional view through the lawn roller.

Figure 3 is a collective detail perspective view of a portion of one of the end plates, showing the lock nut means for forming a water tight joint.

Referring to the drawing, the numeral 1 designates the cylindrical hollow body of the roller, which body may be cast or formed from sheet metal if desired. The ends of the body member 1 are provided with annular channels 2, in which is received the end plates 3 of the roller. The end plates 3, when placed in position, are adhesively joined in the channels 2 by means of white or red lead 4, thereby forming a water tight connection. To prevent outward axial movement of the end plates 3 or the breaking of the sealing joints 4, an axially disposed shaft 5 is provided, and which shaft extends axially through the chamber 6 of the cylindrical body member 1 and the end plates 3. Extending outwardly from the outer walls of the end plates 3 are cylindrical bosses 7, which terminate in substantial registration with the shoulders 8 formed by the reduced threaded ends 9 of the shaft 5. A watertight connection is formed at the ends of the shaft 5 by means of a washer 10 which engages the end of the boss 7 and the shoulder 8 of the shaft, and which washer is forced into close binding engagement with said parts by means of nuts 11, which are threaded on the threaded reduced portions 9 of the shaft, therefore it will be seen that not only is a watertight connection formed between the ends of the shaft 5 and the plates 3, but at the same time the plates are securely tied together for preventing longitudinal movement of the end plates 3. Nuts 11 are held in adjusted positions by means of lock nuts 12 disposed on the reduced portions 9 of the shaft and in the rectangular chambers 13 of which the nuts 11 are disposed, therefore it will be seen when the cotter pins 14 are in position extending through the lock nuts 12 and reduced threaded portions 9 of the shaft 5, a positive holding the end plates 3 is insured, and a positive watertight connection between the ends of the shaft and the end plates 3.

Heretofore it has been practically impossible to exclude the passage of water through the end bearings of the tie rod or shaft 5 and the end plates of rollers, and considerable difficulty has been experienced incident to corrosion of the bearings of the handle member 15 and the roller. To obviate the above difficulty bearing brackets 16 are provided in bearings of which the annular bosses 7 are rotatably mounted. It will be noted that the bearing brackets 16 are disposed within the chambers 17 in the outer sides of the end plates 3, where they will not interfere with the operation of the device by coming into engagement with the bushes or trees during a lawn rolling operation, however as the bosses 7 are disposed within the chambers 17 as well as the brackets 16, it is obvious that the arms 18 of the U-shaped member 19 of the handle member are preferably detachably connected at 20 to the brackets 16, thereby allowing the handle member to be easily attached to the roller after the assembling thereof. In assembling the end plates 3 are placed in position, sealed at 4, and after which the bearing brackets 16 are placed on the bosses 7, and then the nuts 11 are tightened, which action will force the end plates 3 towards each other for insuring a positive sealing thereof, after which the lock nuts 12 are placed in position. It will be noted by providing the detachable means for the handle as shown at 20, handles need not be attached to the rollers at the time of manufacture but may be shipped separated therefrom, and assembled at the time of vending or use of the roller. One of the plates 3 is provided with a removable screw 21, which closes a threaded filling opening 22 in communication with the chamber 6 of the cylindrical body member 1, and through which opening water ballast may be forced for increasing the weight of the roller.

From the above it will be seen that a lawn roller is provided which is simple in construction, the parts reduced to a minimum, and one wherein a positive sealing of the end plates is insured, and handle bearing connections between the end plates and the handle are provided, which are disposed within the chambered ends of the plates and in positions where any leakage of water from the chamber 6 will not reach the same. It will also be seen by rounding the edges 23 of the end plates 3, the roller will not cut or damage the grass as it is rolled over a lawn.

The invention having been set forth what is claimed as new and useful is:—

1. A lawn roller comprising a cylindrical chambered body member, end plates for said body member, sealing means interposed between the body member and the plates, a shaft extending axially through said body member and plates, said shaft having its ends reduced and threaded thereby forming shoulders, outwardly extending bosses carried by the plates and with the outer ends of which the shoulders of the shaft register, a nut threaded on each of the reduced threaded portions of the shaft and engaging the outer ends of the bosses and forming sealing means, a handle member, arms carried by said handle member and overlying the ends of the roller, said bosses being rotatably mounted in bearings of the arms of the handle member.

2. A lawn roller comprising a cylindrical chambered body member, end plates having water tight connections with the ends of the body member, outwardly extending bosses carried by said plates, a handle member, said bosses being rotatably mounted in bearings of the handle member, a shaft extending through said plates and bosses, reduced threaded portions carried by the ends of said shaft and means mounted on said reduced threaded portions and cooperating with the ends of the shaft and the ends of the bosses for forming a watertight joint.

In testimony whereof I have signed my name to this specification in the presence of two subscribing witnesses.

HARRY B. HAMILTON.

Witnesses:
O. E. PROCTOR,
MARY W. MECHLEY.